US009286778B2

(12) United States Patent
Martin et al.

(10) Patent No.: US 9,286,778 B2
(45) Date of Patent: *Mar. 15, 2016

(54) METHOD AND SYSTEM FOR SECURITY SYSTEM TAMPERING DETECTION

(71) Applicant: Sensormatic Electronics, LLC, Boca Raton, FL (US)

(72) Inventors: Walter Andrew Martin, Ballymena (GB); Martin Joseph Donaghy, Belfast (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/018,624

(22) Filed: Sep. 5, 2013

(65) Prior Publication Data

US 2014/0002649 A1 Jan. 2, 2014

Related U.S. Application Data

(63) Continuation of application No. 12/767,132, filed on Apr. 26, 2010, now Pat. No. 8,558,889.

(51) Int. Cl.
*H04N 7/38* (2006.01)
*G08B 13/196* (2006.01)
*G08B 29/04* (2006.01)

(52) U.S. Cl.
CPC .......... *G08B 13/19697* (2013.01); *G08B 29/04* (2013.01); *G08B 29/046* (2013.01)

(58) Field of Classification Search
CPC ............ H04N 21/00; H04N 21/25435; H04N 21/42202; H04N 21/42221; H04N 21/4223; H04N 21/4227; H04N 21/43615; H04N 21/44218; H04N 21/64322; H04N 21/8358; H04N 7/188
See application file for complete search history.

(56) References Cited

U.S. PATENT DOCUMENTS

| | | | |
|---|---|---|---|
| 5,872,594 | A | 2/1999 | Thompson |
| 7,734,110 | B2 | 6/2010 | Bosco et al. |
| 7,852,210 | B2 | 12/2010 | Merritt et al. |

(Continued)

FOREIGN PATENT DOCUMENTS

| | | | |
|---|---|---|---|
| CN | 101093603 | A | 12/2007 |
| CN | 101609580 | A | 12/2009 |

(Continued)

OTHER PUBLICATIONS

2nd Chinese Office Action in both Chinese and its English translation dated Sep. 11, 2014 for corresponding Chinese National Stage Application Serial No. 201180020956.2, Chinese National Stage Entry Date: Apr. 26, 2010, consisting of 6 pages.

(Continued)

*Primary Examiner* — Djenane Bayard
(74) *Attorney, Agent, or Firm* — Christopher & Weisberg, P.A.

(57) ABSTRACT

A method and system for detecting tampering of a security system component is provided. An analytic alarm indicative of potential tampering with a security system component is received. Data from at least one sensor is received. A computing device is used to analyze the analytic alarm and the data from the at least one sensor to determine whether tampering of the security system component has occurred. A qualified alarm signal is generated when the analysis of the analytic alarm and the data from the at least one sensor is indicative of tampering.

20 Claims, 3 Drawing Sheets

(56) References Cited

U.S. PATENT DOCUMENTS

| | | | |
|---|---|---|---|
| 2001/0015409 | A1 | 8/2001 | Mahler et al. |
| 2004/0119861 | A1 | 6/2004 | Bosco et al. |
| 2005/0179539 | A1* | 8/2005 | Hill et al. .................. 340/539.1 |
| 2007/0085674 | A1 | 4/2007 | Sharpe |
| 2007/0247526 | A1 | 10/2007 | Flook et al. |
| 2007/0273794 | A1 | 11/2007 | Sprague et al. |
| 2008/0317356 | A1 | 12/2008 | Itoh et al. |
| 2009/0160667 | A1 | 6/2009 | Musete et al. |
| 2009/0190015 | A1 | 7/2009 | Bechtel et al. |
| 2009/0237516 | A1 | 9/2009 | Jayachandra et al. |
| 2010/0002100 | A1 | 1/2010 | Master et al. |
| 2010/0128126 | A1 | 5/2010 | Takeuchi |
| 2010/0141798 | A1* | 6/2010 | Steinberg et al. ............ 348/234 |
| 2010/0265367 | A1 | 10/2010 | Jannard et al. |
| 2011/0063445 | A1 | 3/2011 | Chew |

FOREIGN PATENT DOCUMENTS

| | | | |
|---|---|---|---|
| EP | 1 079 350 | A1 | 2/2001 |
| EP | 1 109 141 | A1 | 6/2001 |
| WO | 2006/101477 | A1 | 9/2006 |
| WO | 2011/041791 | A1 | 4/2011 |

OTHER PUBLICATIONS

1st Chinese Examination Report and Search Report in both Chinese and its English translation dated Apr. 14, 2014 for corresponding Chinese National Stage Application Serial No. 201180020956.2, Chinese National Stage Entry Date: Apr. 26, 2010, consisting of 19 pages.

International Search Report and Written Opinion dated Aug. 11, 2011 for International Application Serial No. PCT/GB2011/000597, International Filing Date: Apr. 18, 2011, consisting of 11 pages.

Australian Examiner's First Report dated May 8, 2013 for corresponding Australian Application Serial No. 2011247121, Australian Filing Date: Apr. 18, 2011, consisting of 4 pages.

Australian Examiner's Second Report dated Dec. 5, 2013 for corresponding Australian Application Serial No. 2011247121, Australian Filing Date: Apr. 18, 2011, consisting of 4 pages.

3rd Australian Examination Report dated Jun. 3, 2014 for corresponding Australian Application Serial No. 2011247121, Australian Filing Date: Apr. 18, 2011, consisting of 3 pages.

European Communication pursuant to Article 94(3) EPC dated Jul. 13, 2015 for European Patent Application Serial No. 11729335.7-1810, EP Entry Date: Apr. 18, 2011 consisting of 6 pages.

* cited by examiner

METHOD AND SYSTEM FOR SECURITY SYSTEM TAMPERING DETECTION

CROSS-REFERENCE TO RELATED APPLICATION

This application is a Continuation of U.S. patent application Ser. No. 12/767,132, filed Apr. 26, 2010, entitled METHOD AND SYSTEM FOR SECURITY SYSTEM TAMPERING DETECTION, the entirety of which is incorporated herein by reference.

STATEMENT REGARDING FEDERALLY SPONSORED RESEARCH OR DEVELOPMENT n/a

FIELD OF THE INVENTION

The present invention relates generally to a method and system for video surveillance and in particular to a method and system for detecting tampering of a camera in a video surveillance system.

BACKGROUND OF THE INVENTION

Video surveillance is prevalent in society. Whether to protect inventory, property or people, society generally accepts video surveillance as a way to provide security. However, as video surveillance systems become more sophisticated so too do the efforts of wrongdoers who seek to circumvent and/or neutralize these systems. The result is a never ending game of cat and mouse where surveillance system developers add features and functions, which wrongdoers then try to circumvent and/or defeat.

Common methods wrongdoers use to avoid detection in a monitored area is to cover, re-orient or blind the camera through the use of extreme light or otherwise change the scene a security system camera is monitoring. For example, a wrongdoer may move the camera to point it away from the monitored area or even place an image of a “fake” scene in front of the camera lens. If monitoring personnel, e.g., a security guard, is monitoring many cameras, the personnel may not notice the change in scenes and therefore not be alerted that suspicious activity is occurring. While methods are known that address these problems, such methods result in significant false positives and potentially slow response times. For example, a false alarm may be generated if an outdoor camera scene changes due to blowing leaves, car headlights, etc., even though no actual tampering has occurred. False positives are extremely counter-productive and the resulting alarms will likely be ignored by the monitoring personnel. It is therefore desirable to have a method and system that reliably informs the security guard or other monitoring personnel if an alarm event is happening in a manner that reduces, if not eliminates, false positives.

SUMMARY OF THE INVENTION

The present invention advantageously provides a method and system for detecting tampering of a security system component such as a camera. The method and system analyze video analytics indicating potential tampering and sensor data to determine whether the potential tampering is actual tampering. In the case where actual tampering is determined, the method and system generate a qualified alarm which can be sent to a monitoring station or other security system component for further processing.

In accordance with one aspect, the present invention provides a method in which an analytic alarm indicative of potential tampering with a security system component is received. Data from at least one sensor is received. A computing device is used to analyze the analytic alarm and the data from the at least one sensor to determine whether tampering of the security system component has occurred. A qualified alarm signal is generated when the analysis of the analytic alarm and the data from the at least one sensor is indicative of tampering.

In accordance with another aspect, the present invention provides a system for detecting tampering of a security system component, in which there is at least one sensor. A video analytic module generates an analytic alarm indicating potential tampering with the security system component. A tampering monitor is in communication with the at least one sensor and the video analytic module. The tampering monitor receives data from the at least one sensor, analyzes the analytic alarm and the data from the at least one sensor to determine whether tampering of the security system component has occurred, and generates a qualified alarm signal when the analysis of the analytic alarm and the data from the at least one sensor is indicative of tampering.

In accordance with still another aspect, the present invention provides a security system video de-noising method in which noise reduction motion vectors are determined. Data from at least one sensor is received. A computing device is used to correlate the noise reduction motion vectors with the data received from at least one of the at least one sensor to determine noise pixels within the video. The video is de-noised by removing the noise pixels from the video.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
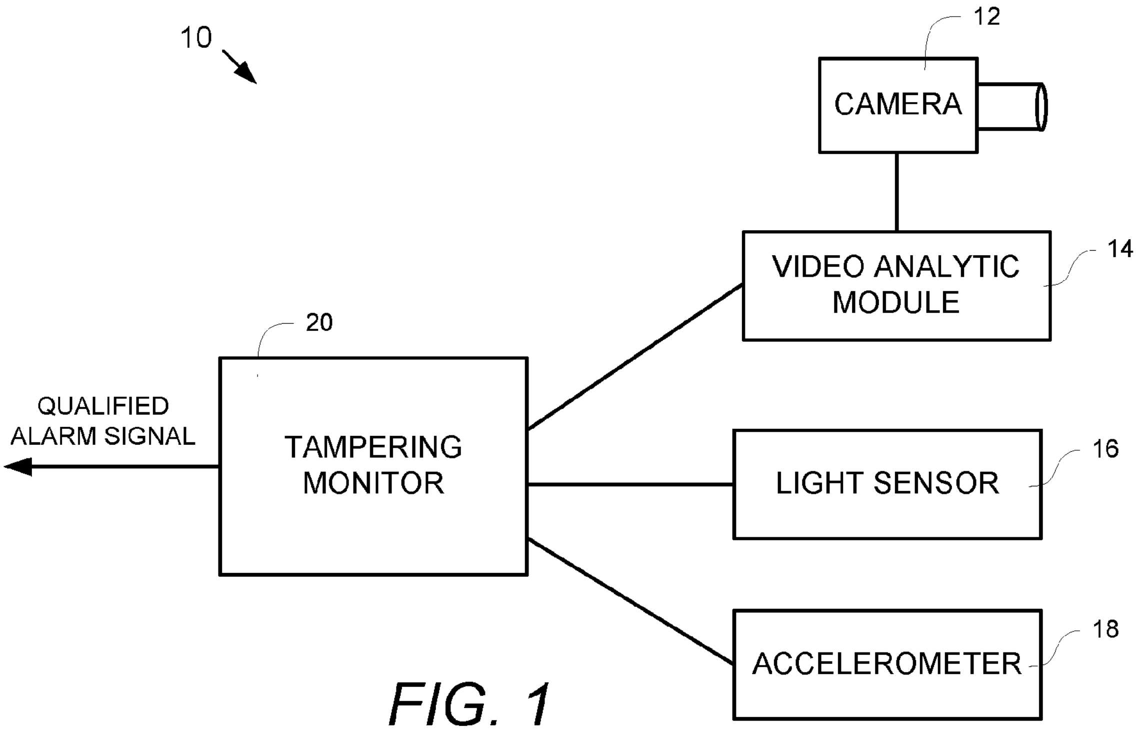
FIG. 1 is a block diagram of an exemplary security system tamper monitoring system constructed in accordance with the principles of the present invention.

Before describing in detail exemplary embodiments that are in accordance with the present invention, it is noted that the embodiments reside primarily in combinations of apparatus components and processing steps related to implementing a system and method that uses video analytics in combination with sensor readings to qualify security monitoring system alarms. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements, there is shown in FIG. 1 an exemplary security system tamper monitoring system constructed in accordance with the principles of the present invention and designated generally as "10." Tamper monitoring system 10 includes camera 12, video analytic module 14, light sensor 16, accelerometer 18 and tampering monitor 20. Of note, although FIG. 1 shows a single camera 12, video analytic module 14, light sensor 16 and accelerometer 18, the present invention is not limited to such. It is contemplated that more than one of each of these devices can be included in tamper monitoring system 10, the quantities being based on system size and scale. A single unit of each item is shown in FIG. 1 solely for ease of explanation.

Further, although FIG. 1 shows camera 12, video analytic module 14, light sensor 16, accelerometer 18 and tampering monitor 20 as physically separate, the invention is not so limited. It is contemplated that one or more of camera 12, video analytic module 14, light sensor 16, accelerometer 18 and tampering monitor 20 can be contained within the same physical housing. Whether or not contained within the same physical housing, accelerometer 18 is coupled to camera 12 to measure the acceleration of camera 12, such as may occur when camera 12 is physically moved, hit or otherwise tampered with. Accelerometer 18 can be a 3-dimensional accelerometer to measure acceleration of the camera in three, i.e., the 'x', 'y' and 'z' directions. Light sensor 16 and accelerometer 18 are generally referred to herein as "sensors." It is understood that the present invention is not limited solely to the use of light sensors and accelerometers. It is contemplated that the principles of the present invention can be applied to the use of other sensors, such as motion sensors, heat sensors, etc.

Figure 2:
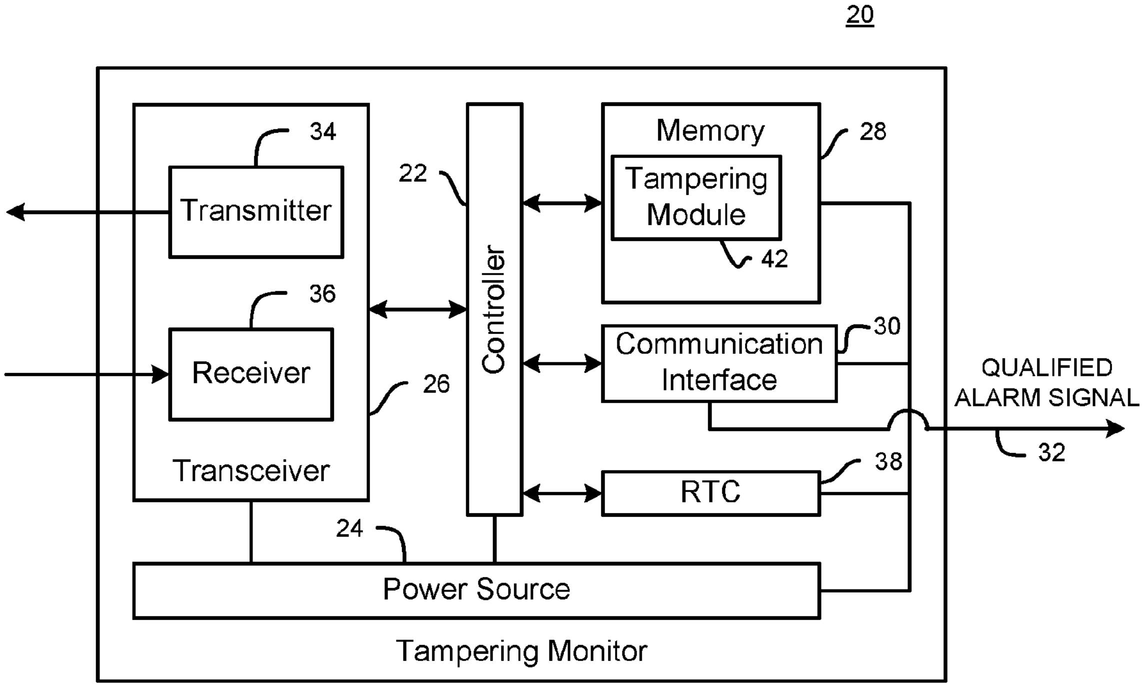
FIG. 2 is a block diagram of an exemplary tampering monitor constructed in accordance with the principles of the present invention.

Referring now to FIG. 2, an exemplary tamper monitoring system 20 may include a controller 22 (e.g., a processor or microprocessor), a power source 24, a transceiver 26, a memory 28 (which may include non-volatile memory, volatile memory, or a combination thereof) and a communication interface 30. The controller 22 controls communications, storage of data to memory 28, communication of stored data to other devices, and generation of a qualified alarm signal 32. The power source 24, such as a battery or AC power, supplies electricity to the tamper monitoring system 20.

The transceiver 26 may include a transmitter 34 and a receiver 36. Transmitter 34 and receiver 36 can communicate via a wired or wireless communication link with video analytic module 14, light sensor 16 and accelerometer 18.

The memory 28 may include a tampering module 42 for determining whether an alarm is a qualified alarm. Operation of the tampering module 42 is described in greater detail below. The tampering module 42 may determine whether to generate and cause communication interface 30 to transmit a qualified alarm signal by analyzing output information received from one or more of the video analytic module 14, light sensor 16 and accelerometer 18. Of note, although FIG. 2 shows qualified alarm signal 32 being transmitted by communication interface 30, the invention is not limited to such. It is contemplated that transmitter 34 can be used to transmit qualified alarm signal 32, thereby eliminating communication interface 30.

The controller 22 may also be electrically coupled to a real-time clock ("RTC") 38 which monitors the passage of time. The RTC 38 may act as a timer to determine whether actuation of events, such as receipt of data from video analytic module 14, light sensor 16 and/or accelerometer 18, occurs within a predetermined time frame. The RTC 38 may also be used to generate a time stamp such that the time of a qualified alarm may be logged and such that sensor data can be correlated with video analytic data.

Figure 3:
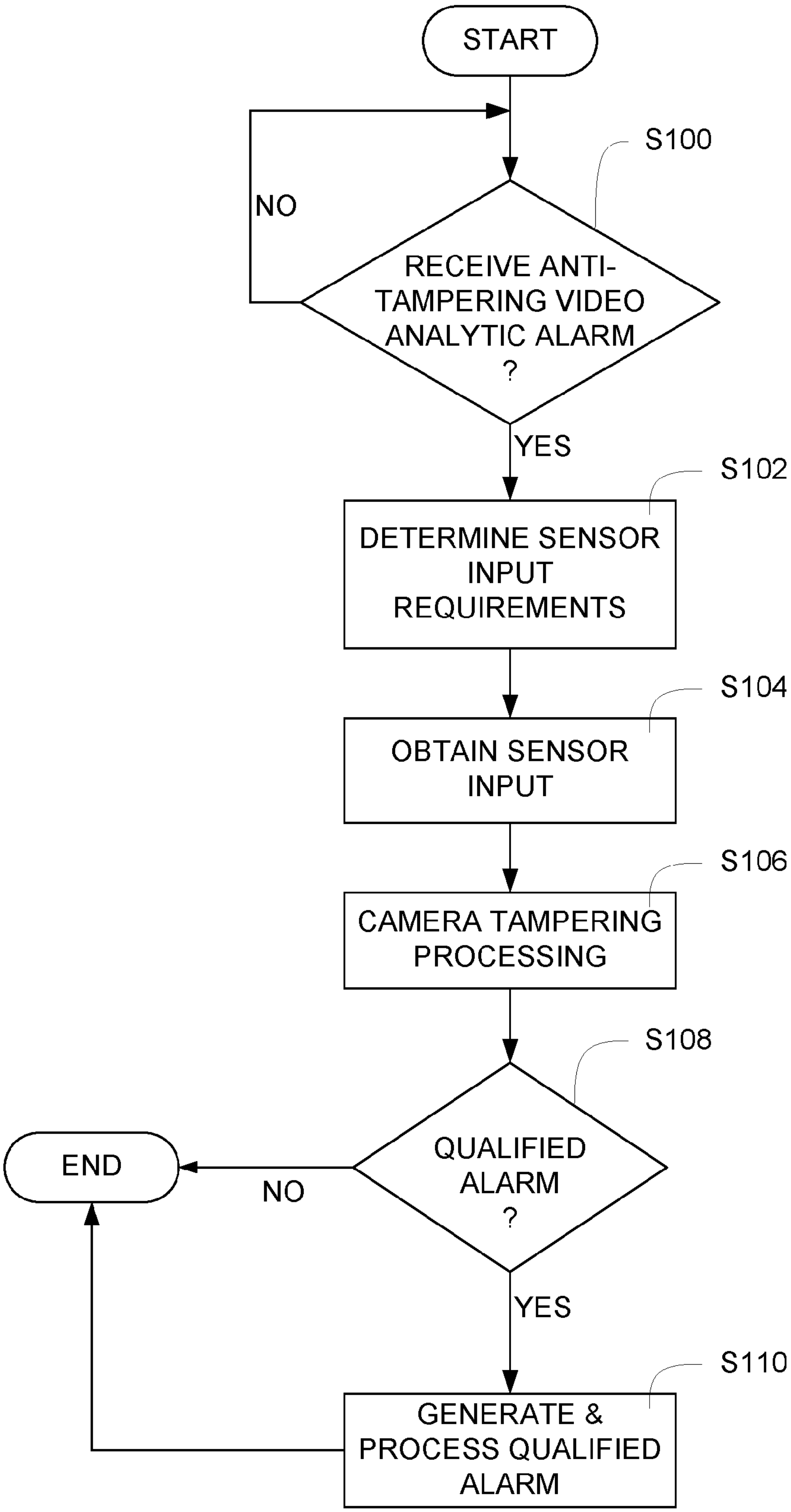
FIG. 3 is a flow chart of an exemplary alarm qualification process in accordance with the principles of the present invention.

An exemplary tamper detection and alarm qualification process is described with reference to FIG. 3. Initially, an anti-tampering video analytic alarm is received from video analytic module 14 (step S100). The analytic alarm is indicative of potential tampering with a security system component such as camera 12. The analytic alarm is received by tampering monitor 20. Tampering monitor 20 determines the sensor inputs needed (step S102) and obtains the corresponding data from system sensors, e.g., light sensor 16 and/or accelerometer 18 (step S102). The sensor inputs are obtained (step S104). Of note, although the step of obtaining sensor input in FIG. 3 (step S104) is shown after the sensor input requirements are determined (step S102), the present invention is not limited to such. It is contemplated that sensors can continuously transmit data to tampering monitor 20 such that the actual sensor data is present and stored within tampering monitor 20 at such time as tampering monitor 20 determines the actual sensor inputs needed to evaluate the received video analytic alarm.

Tampering monitor 20 analyzes the analytic alarm and the data received from the appropriate sensor(s) (step S106) to determine whether tampering of the security system component has occurred (step S108). Tampering monitor 20 generates a qualified alarm signal when the analysis of the analytic alarm and the data from the sensor(s) is indicative of tampering (step S110). In the case where a qualified alarm signal is generated, further processing of the alarm can be performed. Such examples might include transmitting the qualified alarm signal to a security system monitoring facility, sounding an audible alarm, illuminating a visual alarm, and the like.

A number of specific use cases are contemplated and provided by the present invention. These use cases are representative of methods by which wrongdoers may attempt to defeat the security system, such as by altering the operation of security system camera 12. As an example of one use case, video analytic module 14 may execute a reorientation analytic to determine whether the camera has been physically moved, e.g., pointing the camera 12 away from the scene being monitored.

In such case, sensor data from accelerometer 18 and light sensor 16 can be used to determine whether the reorientation is the basis of tampering in order to generate the qualified alarm signal. Tampering monitor 20 evaluates the sensor data received from accelerometer 18 to determine whether a predetermined acceleration threshold has been met, for example, at approximately the same time as the video analytic module detects the physical movement. If the predetermined acceleration threshold has been met, the determination that tampering has occurred is made and the qualified alarm signal generated. The reorientation analysis can be further enhanced by also analyzing the light sensor data to determine whether a change in lighting occurred at approximately the same time as the reorientation of the camera.

Another use case occurs where a wrongdoer attempts to defocus the camera lens in order to obscure the camera's view of the monitored scene. In such case, accelerometer 18 and light sensor 16 can be used to determine whether the lens of camera 12 has been tampered with. Video analytic module 14 reports to tampering monitor 20 the potential tampering by defocusing of the lens on camera 12. Tampering monitor 20 analyzes the data from accelerometer 18 and light sensor 16 to determine whether a predetermined acceleration threshold has been met at approximately the same time as the change in lighting of the scene monitored by camera 12 and the defocusing of the lens of camera 12.

Another tampering use case occurs when a wrongdoer covers the camera lens in an attempt to completely block out any video capture by camera 12. In this case, video analytic module 14 alerts tampering monitor 20 of the potential covering of the lens of camera 12. Data from light sensor 16 and accelerometer 18 can be used to verify that the lens of camera 12 has indeed been covered. In such case, analysis of the sensor data from accelerometer 18 and light sensor 16 includes determining whether a predetermined acceleration threshold has been met at approximately the same time as a change in lighting of the scene monitored by the lens of camera 12 and the potential covering of the camera lens as recorded by video analytic module 14. In this case, accelerometer 18 would report a vibration of camera 12 at approximately the same time as light sensor 16 reports an unnatural change in lighting.

Wrongdoers may attempt to "blind" camera 12 by making a sudden change in light intensity within the monitored scene. For example, a wrongdoer may point a floodlight at camera 12 or render an associated luminary such as a floodlight or infrared illuminator inoperative, thereby making the monitored scene too dark. In such cases, video analytic module 14 will report the potential tampering by indicating that the scene has suddenly become too bright or too dark. Tampering monitor 20 can evaluate the data taken by light sensor 16 at approximately the time that video analytic module 14 detected the change in scene to report that an unnatural change in lighting occurred at approximately the same time as the potential tampering with the monitored scene.

It is also contemplated that camera 12 may perform a video stabilization process in order to provide a stabilized video picture to display monitors within the monitoring station. In such case, data from accelerometer 18 can be used to aid the stabilization process. For example, real time outputs from accelerometer 18 can be factored into the video stabilization method to provide a more robust stabilization than those methods that do not employ the use of accelerometers. For example, if the motion of camera 12 is detected as being only in one plane, the stabilization process can be simplified to operate only in that plane at the time the motion was detected. In such case, tampering monitor 20 or some other computing device can be used to perform the video stabilization process.

The present invention also provides a security system video de-noising method using system 10. For example, real time data acquired from accelerometer 18 and light sensor 16 can be factored into the de-noising method to enhance accuracy and provide a comprehensive de-noising arrangement. Such an arrangement and process is described with reference to FIG. 4. Initially, noise reduction motion vectors are determined (step S112). Methods for determining noise reduction motion vectors are known and are beyond the scope of this invention. Data from at least one sensor can be received and used in the de-noising method. For example, the motion vectors can be correlated with accelerometer value data from accelerometer 18 (step S114). A computing device, such as tampering monitor 20, can be used to correlate the noise reduction motion vectors with the data received from at least one of the accelerometer sensors to determine noise pixels within the video (step S116). The video can be de-noised by removing the noise pixels from the video (step S118).

Optionally, and in addition to or in lieu of using the accelerometer data for correlation, the method of the present invention also provides for the use of data from light sensor 16 to provide enhanced de-noising. In this case, scaled light intensity data from the light sensor is received and a histogram of the light intensity is formed (step S120). In such case, the computing device, such as tampering monitor 20, uses the histogram to determine noise pixels within the video (step S116).

Figure 4:
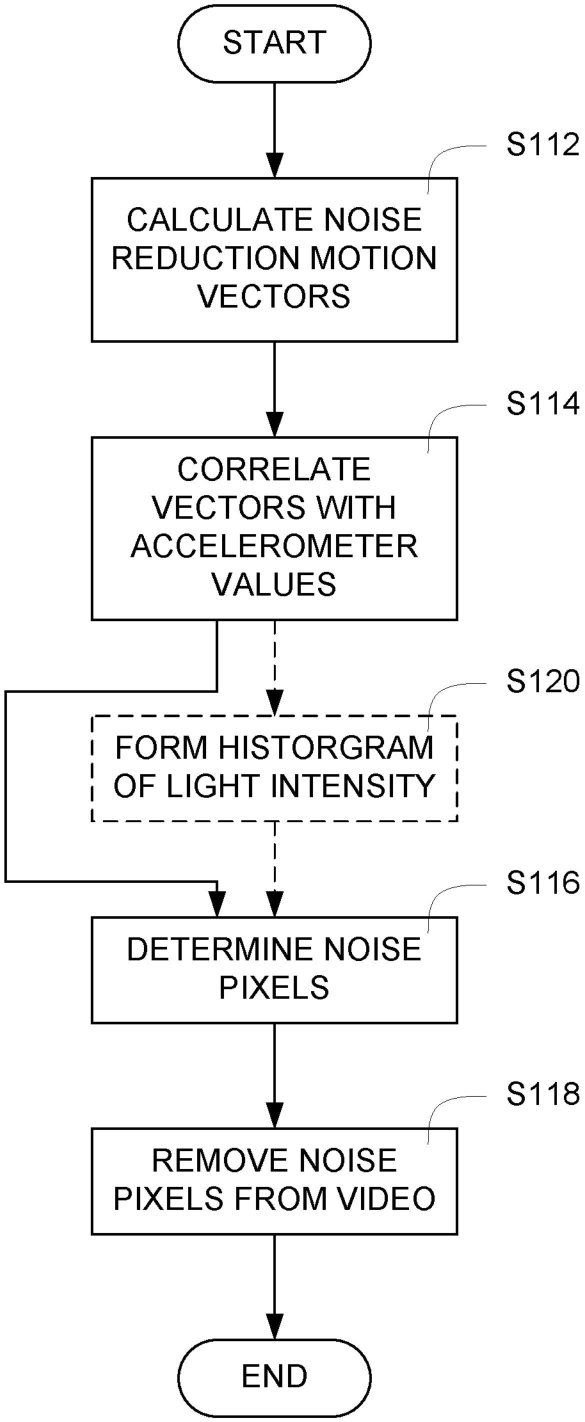
FIG. 4 is a flow chart of an exemplary de-noising process in accordance with the principles of the present invention.

Of note, although the accelerometer correlation step is discussed and shown in FIG. 4 as preceding the light intensity histogram step, the invention is not limited to such an arrangement. It is contemplated that the light intensity histogram application can precede or be used instead of the accelerometer correlation in determining noise pixels. Also, although the de-noising method of FIG. 4 is described with respect to the computing device being tampering monitor 20, the present invention is not limited to such. It is contemplated that another computing device, for example a processor within camera 12 or within a device operating video analytic module 14, can perform the above-described de-noising method.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method of indicating potential tampering with a security system component, the security system component including a camera lens, the method comprising:

receiving an analytic alarm indicative of defocusing of the camera lens;

receiving data from an accelerometer;

receiving data from a light sensor; and using a computing device to analyze the analytic alarm indicative of defocusing of the camera lens, the data from the accelerometer and the data from the light sensor to determine whether tampering of the security system component has occurred, the analysis includes determining whether a predetermined acceleration threshold has been met at approximately a same time as:

a change in lighting of a scene monitored by the camera lens; and the defocusing of the camera lens; and generating a qualified alarm signal when the analysis is indicative of tampering.

2. The method of claim 1, further comprising transmitting the qualified alarm signal to a security system monitoring facility.

3. The method of claim 1, wherein the accelerometer is affixed to the security system component.

4. The method of claim 1, wherein the security system component is a camera.

5. A system for detecting tampering of a security system component, the security system component including a camera lens, the system comprising:

an accelerometer;

a light sensor;

a video analytic module, the video analytic module generating an analytic alarm indicative of defocusing of the camera lens; and a tampering monitor in communication with at least the accelerometer, light sensor and video analytic module, the tampering monitor configured to:

receive data from the accelerometer;

receive data from the light sensor; and analyze the analytic alarm indicative of defocusing of the camera lens, the data from the accelerometer and the data from the light sensor to determine whether tampering of the security system component has occurred, the analysis includes determining whether a predetermined acceleration threshold has been met at approximately a same time as:

a change in lighting of a scene monitored by the camera lens; and the defocusing of the camera lens.

6. The system of claim 5, wherein the tampering monitor is configured to null data received from the accelerometer to account for normal movement of the security system component.

7. The system of claim 5, wherein the tampering monitor is further configured to transmit the qualified alarm signal to a security system monitoring facility.

8. The system of claim 5, wherein the accelerometer is affixed to the security system component.

9. The system of claim 8, wherein the security system component is a camera.

10. A system for detecting tampering of a security system component, the system comprising:

an accelerometer affixed to the security system component, the accelerometer configured to measure acceleration of the security system component;

a video analytic module, the video analytic module configured to generate an analytic alarm, the analytic alarm indicating potential tampering with the security system component; and a tampering monitor in communication with the accelerometer and the video analytic module, the tampering monitor configured to:

receive acceleration data from the accelerometer;

analyze the analytic alarm and the acceleration data to determine if the acceleration data meets a predefined acceleration threshold at approximately the same time as the generation of the analytic alarm; and generate a qualified alarm signal if the determination is made that the acceleration data meets the predefined acceleration threshold at approximately the same time as the generation of the analytic alarm.

11. The system of claim 10, wherein the security system component is a camera.

12. The system of claim 11, wherein the analytic alarm is generated if the video analytic module detects defocusing of a lens of the camera.

13. The system of claim 11, wherein the analytic alarm is generated if the video analytic module detects potential covering of a lens of the camera.

14. The system of claim 10, wherein the accelerometer is a 3-dimensional accelerometer.

15. The system of claim 10, wherein the analytic alarm is generated if the video analytic module detects movement of the security system component.

16. The system of claim 10, further comprising a light sensor, the light sensor configured to detect changes in lighting of a scene being monitored by the security system component; and the analysis further includes determining if the acceleration data meets the predefined acceleration threshold at approximately the same time as the generation of the analytic alarm and a change in lighting of the scene being monitored.

17. The system of claim 10, wherein the analytic alarm is generated if the video analytic module detects a rate of change in lighting greater than a predefined rate.

18. The system of claim 10, wherein the tampering monitor is configured to null data received from the accelerometer to account for normal movement of the security system component.

19. The system of claim 10, further comprising a transmitter, the transmitter configured to transmit the qualified alarm signal to a monitoring facility.

20. The system of claim 10, wherein the tampering monitor is configured to discard the analytic alarm if the determination is made that the acceleration data does not meet the predefined acceleration threshold at approximately the same time as the generation of the analytic alarm.

* * * * *